United States Patent [19]

Cyr et al.

[11] Patent Number: 4,899,345
[45] Date of Patent: Feb. 6, 1990

[54] ATOMIC RESONANCE IN CROSSED LINEAR POLARIZATION

[75] Inventors: Normand Cyr, Ste-Foy; Michel Têtu, Cap-Rouge, both of Canada; Vincent Giordano, Orsay, France

[73] Assignee: Universite Laval, Quebec, Canada

[21] Appl. No.: 341,209

[22] Filed: Apr. 21, 1989

[51] Int. Cl.[4] ............................................. H01S 3/13
[52] U.S. Cl. ..................................... 372/32; 371/11; 371/37
[58] Field of Search ....................... 372/11, 32, 29, 37, 372/27

[56] References Cited

U.S. PATENT DOCUMENTS 4,435,808 3/1984 Javan .................................... 372/11

Primary Examiner—Léon Scott, Jr.
Attorney, Agent, or Firm—Cushman, Darby & Cushman

[57] ABSTRACT

A method and apparatus for deriving information on a light beam. The light beam is processed by an optical system to produce two quasi-collinear beams propagating in opposite directions, namely pump and probe beams with orthogonal linear polarizations. The beams interact with the medium contained in a cell, which medium is capable to manifest absorption resonance. As a result of the beams interaction with the medium, the intensity of the probe beam transmitted through the medium, considered along a predetermined polarization axis, becomes representative of a particular state of absorption resonance of the medium, which resonance occurs when the frequencies of the pump and probe beams are located within a narrow absorption resonance frequency bandwidth characterizing the medium. The invention finds applications in the laser spectroscopy technology as well as in the construction of frequency stabilized laser sources, optical filters and optical communication systems, among others.

19 Claims, 3 Drawing Sheets

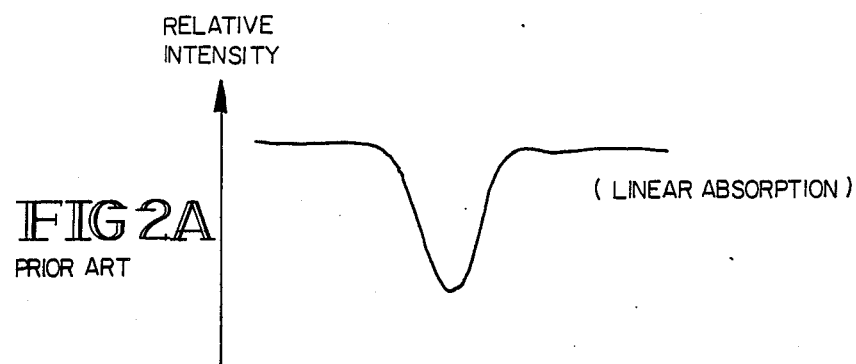
FIG. 2A PRIOR ART (LINEAR ABSORPTION)
FIG. 2B PRIOR ART (SATURATED ABSORPTION)
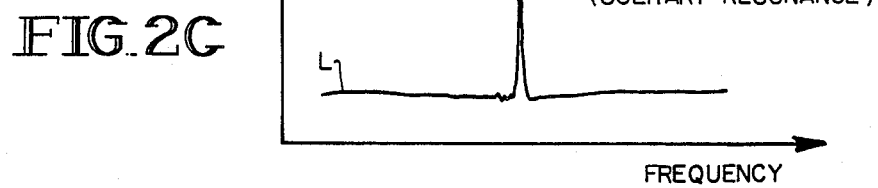
FIG. 2C (SOLITARY RESONANCE)

ATOMIC RESONANCE IN CROSSED LINEAR POLARIZATION

The present invention relates to a method and an apparatus for deriving information on physical elements such as light, magnetic field, etc, by using the resonance absorption phenomenon of a certain medium. The invention finds practical applications in the construction of frequency stabilized laser sources, optical filters and optical communication systems, among others.

In various applications involving lasers, a frequency stabilized laser source is required. An example of such application is the optical fiber heterodyne communication system where the laser oscillators at the transmitter and at the receiver stations must operate at a very stable frequency, any frequency drift being susceptible to degrade the performance of the system.

A number of approaches to laser frequency stabilization have involved the provision of a feedback loop where an error signal is generated in the event of a frequency drift of the laser oscillator, which error signal is used to vary the oscillator frequency by means of an electronic or an optical system to bring the frequency back to a desired value. An example of such frequency stabilized laser source is described in the U.S. Pat. No. 3,921,099 which has been granted to Hughes Aircraft Company, on Nov. 18, 1975. The feedback system comprises a frequency transducer in the form of a Stark-effect cell containing a gas having an absorption resonance in the vicinity of the output frequency of the laser, which resonance can be frequency tuned across the bandwidth of the laser by generation of a suitable electric field within the cell. The output of the frequency transducer is processed and applied to an electromechanical transducer supporting one of the laser reflectors to move the reflector in a longitudinal direction along the laser axis and thereby adjust the oscillation frequency.

The frequency transducer is of critical importance in any application involving frequency stabilization of a laser source. Commonly used transducers, like Fabry-Perot resonators, suffer from the drawback that their absolute resonance frequency value is not well defined and that their long term frequency stability characteristics are relatively poor.

The present invention addresses this problem and aims to provide a new method and an apparatus for deriving frequency information on a light beam. However, as it will appear from the following description, the invention is not limited to providing frequency information only, but it may be used to obtain other types of information as well, in addition to being useful for applications other than frequency stabilization of a laser source.

The present inventors have found that when two quasi-collinear light beams, namely pump and probe beams, having linear and generally orthogonal polarizations, interact with a medium capable to manifest absorption resonance when subjected to a non zero substantially non fluctuating magnetic field, the intensity of the probe beam transmitted through the medium, when considered along a predetermined polarization axis, becomes indicative of a particular state of absorption resonance of the medium, which resonance occurs when the frequencies of the pump and probe beams are located within a narrow absorption resonance frequency bandwidth characterizing the medium. The intensity of the transmitted probe beam shows this particular state of absorption resonance with a high contrast, thus greatly facilitating the practical application of the phenomenon.

Presently, it is believed that the interaction of the pump and probe beams with the medium causes the polarization of the probe beam to shift when the medium is in the particular state of absorption resonance. This polarization shift can be sensed by measuring the intensity of the probe beam transmitted through the medium along a predetermined polarization axis which preferably is orthogonal to the polarization of the transmitted probe beam when the medium is out of resonance. It should be appreciated that the beam intensity measurement along a predetermined polarization axis constitutes the most convenient way to evaluate the polarization of the transmitted probe beam, however, the information relative to the particular state of resonance of the medium is essentially conveyed by the polarization of the beam, not its intensity. Therefore, means to determine the polarization of the beam without resorting to measuring its intensity, may also be used without departing from the spirit of the invention.

The medium must be subjected to a suitable non-fluctuating magnetic field and it is within the present art to provide the instrumentality for establishing the proper magnetic field, in accordance with the specific operating conditions, intended application, etc.

The invention may be used for the construction of a laser oscillator operating at a frequency locked on the frequency, in the narrow absorption resonance frequency bandwidth of the medium, at which a maximum intensity of the probe beam, along the predetermined polarization axis, is measured. As the latter frequency is fixed and basically depends upon the nature of the medium, a laser source operating at a very stable and precisely defined frequency may be provided.

The invention may also be used for the construction of highly selective optical filters, optical instrumentation and optical communication systems, among others.

Another possible application for this invention is a device for detecting the presence of a magnetic field by monitoring the particular state of resonance of the medium.

Herein, the term "light" is intended to encompass an electromagnetic radiation in the wavelength range including infrared, visible, ultraviolet and x rays.

In a preferred embodiment, the apparatus for observing the particular absorption resonance phenomenon, in accordance with the present invention, includes a laser source coupled to a beam splitter which divides the light beam in two outputs, namely one intense beam acting as a pump and a weaker beam acting as a probe. The pump beam is directed toward a cell containing a gas, for example rubidium vapour, through a polarizer and a separator block. The probe beam is oriented by a set of mirrors toward the gas cell along a direction generally collinear with the direction of the pump beam but opposite thereto. The probe beam passes through a polarizer before reaching the gas cell. The probe beam, transmitted through the gas cell, is directed by the separator block toward an analyser with a polarization axis oriented generally perpendicularly to the polarization of the probe beam transmitted through the medium when the gas is out of resonance. The output of the analyser is fed through an optical system to a photodetector generating an output signal indicative of the particular state of resonance of the gas. The output signal of the photo-detector may then be applied to a feedback loop for locking the laser at the frequency for which the output signal from the photo-detection is maximal. If the pump and probe beams are generated from different sources, the output signal may constitute in itself an output of an optical bandpass filter having a central frequency corresponding to the central frequency of the narrow absorption resonance frequency bandwidth characterizing the gas in the cell.

More specifically, the present invention is related, in a general aspect, to a combination including:

a cell containing a medium capable to manifest light absorption resonance;

means for generating substantially collinear pump and probe light beams propagating toward the cell in opposite directions to interact with the said medium, the pump and probe light beams having linear polarizations which are generally orthogonal;

means for producing a substantially non-fluctuating magnetic field within the cell to allow the medium to manifest a particular state of light absorption resonance when the frequencies of the pump and probe light beams are located within a narrow absorption resonance frequency bandwidth characterizing the medium; and means responsive to the polarization of the probe beam transmitted through the medium, optically coupled to the cell, for generating an output signal indicative of the particular state of absorption resonance.

The invention is also concerned with a method for causing a certain medium capable to manifest light absorption resonance to assume a particular state of absorption resonance, and for deriving information relative to the state of absorption resonance of the medium, the method comprising the steps of:

generating substantially collinear pump and probe light beams propagating in opposite directions toward a cell containing the medium to interact with the said medium, the pump and probe light beams having linear polarizations which are generally orthogonal;

subjecting the medium to a substantially non-fluctuating magnetic field to cause the medium to manifest the particular state of light absorption resonance when the frequencies of the pump and probe light beams are located within a narrow absorption resonance frequency bandwidth characterizing the medium; and determining the polarization of the probe beam transmitted through the medium to derive information indicative of the particular state of absorption resonance in the medium.

A preferred embodiment of this invention will now be described with relation to the annexed drawings, in which:

FIGS. 2a, 2b and 2c are graphs of resonances in linear absorption, saturated absorption and of the type (solitary resonance) observed in conjunction with the set-up shown in FIG. 1, respectively (FIGS. 2a and 2b are labelled as prior art)

Throughout the drawings, the same elements bear identical reference numerals.

Figure 1:
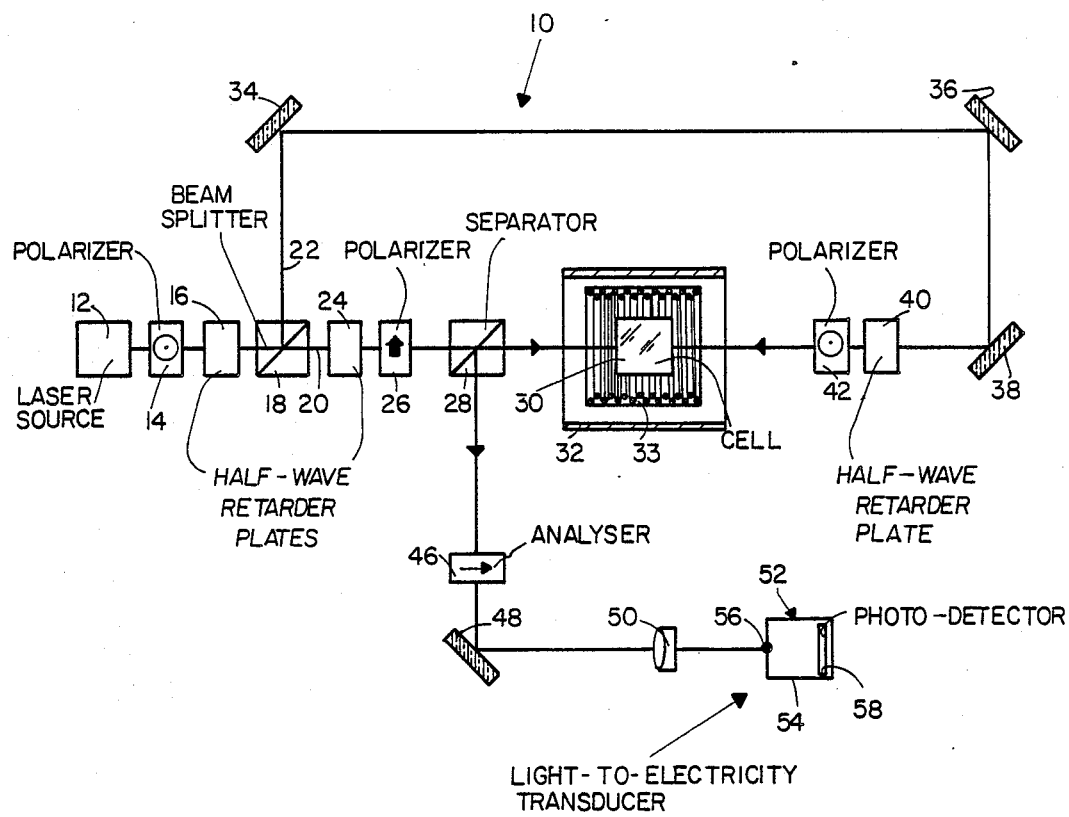
FIG. 1 is a schematical illustration of a set-up that may be used for obtaining frequency information on a light beam, in accordance with the present invention.

Referring now to FIG. 1 of the annexed drawings, the reference numeral 10 designates generally a set-up that may be used for gathering frequency information on a light beam.

The set-up 10 includes a quasi-monochromatic laser diode source 12 whose output is applied to the input of a polarizer 14. The latter polarizer 14 orients the linear polarization of the quasi-monochromatic light beam from the source 12 in the direction shown in block 14 (FIG. 1). The polarized beam from the polarizer 14 is supplied to the input of a polarizing beam splitter 18 through a half-period retarder plate 16. The function of the polarizing beam splitter 18 is to split the light beam received at its input into a pump light beam 20 and a probe light beam 22. The block 16 turns the polarization of the light beam at the input of the splitter 18 to obtain a probe beam 22 of desired low intensity and a pump beam 20 of desired high intensity.

The pump beam 20 traverses a half-period retarder plate 24, a polarizer 26 and a separator block 28 before entering a cell 30 containing a gas, such as rubidium vapour. It should be appreciated that the medium in the cell 30 may also be of molecular nature provided that it exhibits suitable absorption resonance characteristics. The polarizer 26 orients the linear polarization of the pump beam in the direction shown in block 26 (FIG. 1) before it enters the cell 30, while the retarder plate 24 turns the linear polarization of the pump beam, before it is supplied to the input of the polarizer 26. Rotation of the linear polarization of the pump beam 20 before it is applied to the polarizer 26 enables adjustment of the intensity of this beam 20 as it exits the polarizer 26. More specifically, the pump beam 20 is attenuated in the polarizer 26.

The probe beam 22 from the polarizing beam splitter 18 is reflected on mirrors 34, 36 and 38 to orient the beam 22 in a direction opposite to the direction of propagation of the pump beam 20. Downstream of the mirror 38 are located a half-period retarder plate 40 and a polarizer 42. The polarizer 42 orients the linear polarization of the probe beam in the direction shown in block 42 (FIG. 1) before it enters the cell 30, while the retarder plate 40 turns the linear polarization of the probe beam before it is supplied to the input of the polarizer 42. Rotation of the polarization of the probe beam 22 before it is applied to the polarizer 42 enables adjustment of the intensity of this beam 22 as it exits the polarizer 42. More specifically, the probe beam 22 is attenuated by the polarizer 42.

The above described set-up of FIG. 1 accordingly generates two quasi-collinear, that is substantially collinear pump and probe beams propagating in opposite directions toward the cell 30 and having linear polarizations which are generally orthogonal. Indeed, one can appreciate from FIG. 1, that the polarizers 26 and 42 orient the respective polarizations of the pump and probe beams in orthogonal directions.

When it is subjected to a non-fluctuating magnetic field, the rubidium vapour in the cell 30 manifests a particular light absorption resonance if the frequency of the pump and probe beams (laser frequency) has an appropriate value.

Although the terrestrial magnetic field is sufficient for the resonance phenomenon to occur, for practical purposes, it is preferred to shield the cell 30 from the terrestrial magnetic field and to artificially generate a much more stable magnetic field. To that effect, an appropriate magnetic shield 32 positioned around the cell 30 shields the latter cell from the terrestrial magnetic field, and an appropriate solenoid 33 within the shield 32 is supplied with direct current to artificially produce the required non fluctuating magnetic field. It is within the present art to select the characteristics of the shield 32 and of the solenoid 33, in accordance with the intended application.

Although, in most instances, the cell 30 will be subjected to an artificially produced magnetic field, it is clearly within the scope of the invention to employ the terrestrial magnetic or local field for certain applications.

The probe beam 22 transmitted through the cell 30 is directed toward an analyser 46 by the separator 28.

When the rubidium vapour in the cell 30 is out of resonance, the probe beam 22 reaches the analyser 46 with a given polarization. The analyser 46 consists of a polarizer with a polarization axis oriented generally perpendicularly to the latter, given polarization of the probe beam reaching the analyser 46 when the rubidium vapour is out of absorption resonance.

Rubidium vapour presents two light absorption lines, one at the wavelength of 780 nm ($D_2$ line) and the other at the wavelength of 795 nm ($D_1$ line), and it may be induced in a state of light absorption resonance by a laser beam having a wavelength in the 0.8 $\mu$m range. For example, when the laser frequency coincides with the $D_2$ line and in presence of a non-zero magnetic field, one can observe a solitary bright absorption resonance (solitary line) over a relatively dark background L (FIG. 2c) through a measurement of the intensity of the probe beam in the direction of the polarization axis of the analyser 46. This solitary line corresponds to the cycling transition $5S_{\frac{1}{2}}$, $F=2 \leftarrow 5P_{3/2}$, $F=3$ of the medium, namely the rubidium vapour and has an unsaturated width of approximately 20 MHz resulting from an estimated natural linewidth of 5 MHz and an estimated laser linewidth of 15 MHz. The observed solitary line is referenced S in FIG. 2c. The latter Figure shows the evolution of the relative intensity of the probe beam reaching the analyser 46 in the direction of the polarization axis of the latter analyser.

When the laser frequency does not coincide with the narrow frequency bandwidth of the solitary line, the analyser 46 produces, in response to the received probe beam, a very weak output signal (L in FIG. 2c) since the polarization of the input probe beam is orthogonal to the polarization axis of the analyser 46. When the laser frequency, that is the frequency of the pump and probe beams, approaches the narrow solitary resonance frequency bandwidth, the pump beam 20 interact with the vapour in the cell to force the particular state of solitary absorption resonance of the rubidium vapour, which particular state of resonance causes a change in the polarization of the probe beam 22 reaching the analyser 46, due to interaction of the probe beam with the medium in the cell 30. The polarization of the probe beam transmitted through the cell is no longer orthogonal to the polarization axis of the analyzer 46, thus resulting in an increase of its output signal, as the polarization of the input probe beam has a component parallel to the polarization axis of the analyser. The output signal is at its maximum when the laser frequency coincides with a substantially central frequency of the narrow solitary resonance frequency bandwidth.

Any drift of the laser frequency from the central solitary resonance frequency results in a reduction in amplitude of the output signal from the analyser 46 since the polarization of the probe beam transmitted through the cell, remains in its initial orientation when the rubidium vapour is out of resonance. This phenomenon is illustrated in FIG. 2c.

A definite advantage of the invention resides in the fact that the polarization shift of the probe beam transmitted through the medium of the cell 30 occurs within a relatively limited frequency range (narrow solitary resonance frequency bandwidth), a maximum in the output signal of the photo-detector 58 allowing to ascertain with a relative accuracy that the laser frequency corresponds to the above defined central solitary resonance frequency.

It is accordingly very important that the laser source 12 produces a quasi-monochromatic light beam. Indeed, the light beam from the source 12 should have a well defined frequency to cause the solitary resonance of FIG. 2c within a narrow frequency bandwidth. It is of course within the scope of the present invention to use a source 12 which is not necessarily of the laser type.

Under conditions similar to those described hereinabove with reference to FIG. 1, FIG. 2a shows the evolution of the total relative intensity of the probe beam transmitted through the rubidium vapour of the cell 30 versus the laser frequency in the absence of pump beam (linear absorption), while FIG. 2b shows the evolution of the total relative intensity of the probe beam transmitted through the rubidium vapour versus the laser frequency in presence of a pump beam (saturated absorption) but observed without the analyser 46. The measurements presented in FIGS. 2a and 2b have been used in the prior art to detect light absorption resonance in the medium of the cell. In the first case of FIG. 2a, absorption resonance is detected through a reduction in total luminous intensity of the probe beam and the frequency bandwidth in which the absorption phenomenon is produced is relatively wide. In the second case of FIG. 2b, the resonance phenomenon shows many narrow features but they are observed over a high intensity background and they somehow overlap. The present invention, as evidenced in FIG. 2c, proposes to observe absorption resonance in the medium through a measurement of light intensity over a substantially dark background. One skilled in the art can appreciate that detection of a luminous intensity over a substantially dark background is easier than detection of a change of luminous intensity of an already luminous background. Moreover, the solitary line S of FIG. 2c is very narrow with respect to the phenomena observed in FIGS. 2a and 2b and is the result of only one resonance line thereby improving the accuracy with respect to frequency of the detection.

Referring back to FIG. 1, the light beam at the output of the analyser 46 is supplied to a light-to-electricity transducer 52 through a mirror 48 and a lens 50. The transducer 52 comprises a photo-detector 58 on which the light beam collimated by the lens 50 is projected through a pin-hole 56 in a housing 54 of the transducer containing the photo-detector 58. The latter photo-detector produces an output electric signal, representative of the intensity of the light beam from the analyser 46.

Figure 3:
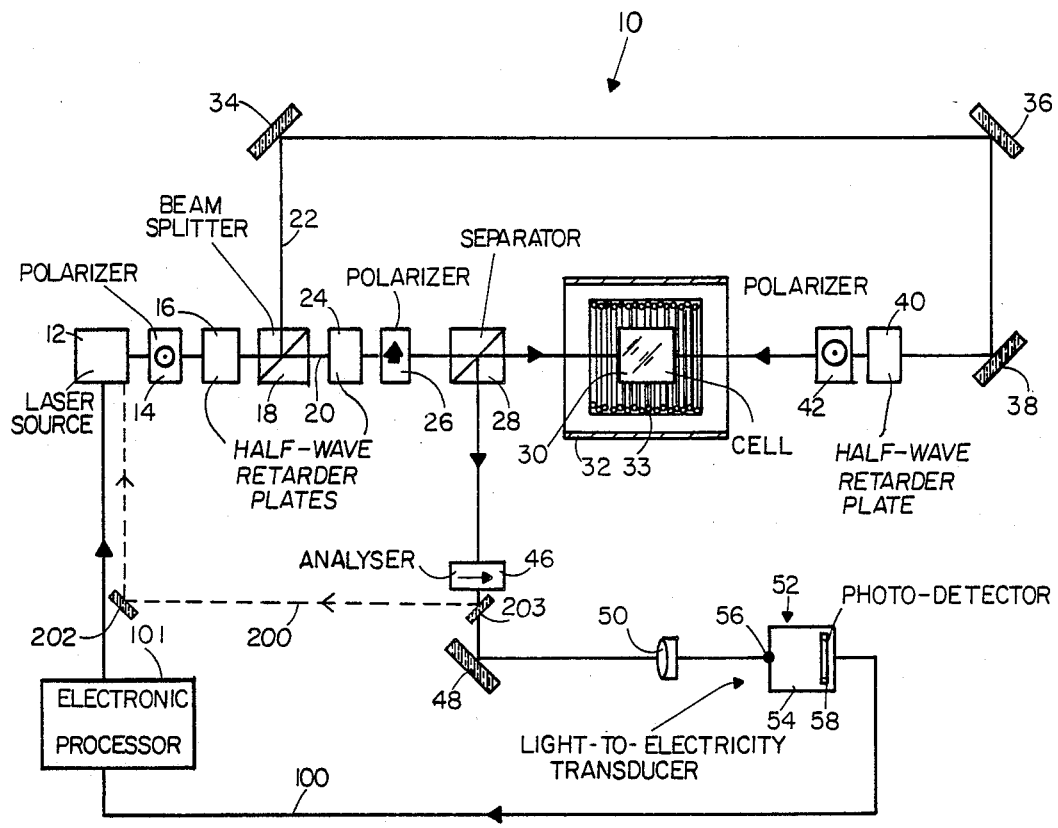
FIG. 3 is a schematical illustration of a frequency stabilized laser source, in accordance with the invention.

The frequency information obtained from the photo-detector 58 may be used for various applications. For example, when it is desired to construct a frequency stabilized laser source, the output signal from the photo-detector 58 may be applied to a feedback loop to control the oscillation frequency of the laser 12 so that its frequency is locked on the above defined central solitary resonance frequency of the medium contained in the cell 30. FIG. 3 schematically illustrates such a frequency stabilized laser source. The set-up of FIG. 3 is the same as that of FIG. 1 to the exception that it comprises an electrical feedback loop 100 with an electronic processor 101. The processor 101 controls the frequency of operation of the laser oscillator 12 at a value for which it detects a maximal amplitude of the output signal of the photo-detector 58. It is also within the scope of the present invention to construct an optical feedback loop 200 (FIG. 3) with optical elements. In this case, the light beam from the output of the analyser 46 is reflected by two mirrors 202 and 203 and sent back to the active medium of the laser oscillator 12 to control its emission, as illustrated with dashed lines in FIG. 3. The optical path between the analyser 46 and the active laser medium has a length which adjusts the phase of the optical wave reaching the laser medium adequately to control the frequency of operation of the laser oscillator 12 at a value causing a maximal stable intensity of the light beam at the output of the analyser 46. The phenomenon involved in the control of the frequency of operation of a laser oscillator by means of an optical wave applied to the active laser medium is known in the art and will not be further elaborated in the present description. The frequency stabilized laser may be used in optical communication systems or the like.

The invention can also be used for the construction of highly selective bandpass optical filters. The structure of such a filter, basically corresponding to the set-up 10, has an input embodied by the input of the polarizer 42, and an output constituted by the output of the analyzer 46. The output signal, generated by the filter, will show a substantial increase in intensity only when the frequency of the probe light beam at the input is located within the narrow solitary resonance frequency bandwidth of the medium in the cell 30, otherwise the output will be low. The same set-up can be used as a frequency selective optical receiver when the output of the analyser 46 is sensed by a light-to-electricity transducer such as 52.

Another possible application is a device for detecting magnetic fields, the presence of a magnetic field causing the medium to assume a resonance state, assuming that the other conditions to allow this resonance are satisfied.

By the same principle, a light intensity modulator can be realized by modulating the magnetic field produced through the solenoid 33.

It should be appreciated that for each application, the reference frequency of the system is extremely stable because it depends basically upon the medium in the cell 30. This reference frequency may be varied by changing the medium.

It should also be noted that the two polarizers 26 and 42, thanks to their orthogonal polarization axes, considerably reduce the problems relative to optical feedback, usually encountered in systems as illustrated in FIGS. 1 and 3, particularly when the source 12 uses laser diodes very sensitive to such optical feedback.

The above description of a preferred embodiment of the invention should not be interpreted in any limiting manner since this embodiment may be varied and refined in various ways without departing from the spirit of the invention.

The embodiments of the invention in which an exclusive property or privilege is claimed are defined as follows:

1. In combination:

a cell containing a medium capable to manifest light absorption resonance;

means for generating substantially collinear pump and probe light beams propagating toward said cell in opposite directions to interact with the said medium, said pump and probe light beams having linear polarizations which are generally orthogonal;

means for producing a substantially non-fluctuating magnetic field within said cell to allow the said medium to manifest a particular state of light absorption resonance when the frequencies of said pump and probe light beams are located within a narrow absorption resonance frequency bandwidth characterizing said medium; and means responsive to the polarization of the probe beam transmitted through said medium, optically coupled to said cell for generating an output signal indicative of said particular state of absorption resonance.

2. A combination as defined in claim 1, wherein said polarization responsive means comprise means responsive to a component of the polarization of the probe beam transmitted through said medium for generating the said output signal, said component having a given orientation with respect to the polarization of the probe beam transmitted through the medium when said medium is out of resonance.

3. A combination as defined in claim 2, wherein said polarization component is oriented substantially orthogonally with respect to the polarization of the probe beam transmitted through the medium when said medium is out of resonance.

4. A combination as defined in claim 1, in which said particular state of light absorption resonance is a state of solitary absorption resonance, and said narrow absorption resonance frequency bandwidth is a narrow solitary resonance frequency bandwidth characterizing the said medium of the cell.

5. A combination as defined in claim 1, wherein said means responsive to the polarization of the probe beam transmitted through said medium include means to measure the intensity of the probe beam transmitted through said medium along a predetermined polarization axis.

6. A combination as defined in claim 5, wherein said means to measure the intensity of the probe beam transmitted through said medium include a polarizer with an output optically coupled to a light-to-electricity transducer.

7. A combination as defined in claim 6, wherein said polarizer has a polarization axis oriented substantially orthogonally with respect to the polarization of the probe beam transmitted through said medium when said medium is out of resonance.

8. A combination as defined in claim 1, wherein said means for generating the pump and probe light beams include a single quasi-monochromatic light source.

9. A combination as defined in claim 8, wherein said single quasi-monochromatic light source includes a laser oscillator.

10. A combination as defined in claim 1, wherein said pump and probe beams generating means comprise:

a laser oscillator for generating a light beam; and optical means coupled to said laser oscillator for producing from the light beam generated by said laser oscillator said substantially collinear pump and probe light beams.

11. A combination as defined in claim 5, in which said means to measure the intensity of the probe beam transmitted through the medium of the cell comprise a polarizer, said pump beam propagates toward the cell through a light beam separator, and said separator comprises means for receiving said probe beam transmitted through the medium and for directing it toward said polarizer.

12. A combination as defined in claim 1, wherein said pump beam is of higher intensity than the probe beam.

13. A method for causing a certain medium capable to manifest light absorption resonance to assume a particular state of absorption resonance, and for deriving information relative to the state of absorption resonance of said medium, said method comprising the steps of:
  generating substantially collinear pump and probe light beams propagating in opposite directions toward a cell containing the medium to interact with the said medium, said pump and probe light beams having linear polarizations which are generally orthogonal;
  subjecting said medium to a substantially non-fluctuating magnetic field to cause said medium to manifest said particular state of light absorption resonance when the frequencies of said pump and probe light beams are located within a narrow absorption resonance frequency bandwidth characterizing said medium; and
  determining the polarization of the probe beam transmitted through said medium to derive information indicative of the said particular state of absorption resonance in the medium.

14. A method as defined in claim 13, wherein the polarization determining step comprises measuring the intensity of the probe beam transmitted through said medium along a predetermined polarization axis.

15. A method as defined in claim 14, wherein said polarization axis is substantially orthogonal to the polarization of the probe beam transmitted through said medium when said medium is out of resonance.

16. A method as defined in claim 13, in which said pump and probe beam generating step comprises generating a light beam from a single source, and optically processing the last mentioned light beam to produce said pump and probe light beams.

17. A frequency stabilized laser source, including:
  a laser oscillator for generating a laser beam at a frequency within a predetermined frequency range;
  a cell containing a medium capable to manifest light absorption resonance;
  optical means coupled to said laser oscillator and to said cell, said optical means optically processing said laser beam to produce substantially collinear pump and probe light beams propagating toward said cell in opposite directions to interact with the said medium, said pump and probe light beams having linear polarizations which are generally orthogonal;
  means for producing a substantially non-fluctuating magnetic field within said cell to allow said medium to manifest a particular state of light absorption resonance when the frequencies of said pump and probe light beams are located within a narrow absorption resonance frequency bandwidth characterizing said medium and situated within said predetermined frequency range; and
  laser oscillator frequency control means interposed between said cell and said laser oscillator, said laser oscillator frequency control means being responsive to the polarization of the probe beam transmitted through said medium to maintain the frequency of operation of said laser oscillator at a value causing said medium to assume said particular state of absorption resonance.

18. A frequency stabilized laser source according to claim 17, wherein said laser oscillator frequency control means comprise:
  means for measuring the intensity of the probe beam transmitted through said medium along a predetermined polarization axis;
  means for detecting a maximum value of the measured intensity of the probe beam when the medium is in said particular state of absorption resonance; and
  means for maintaining the frequency of operation of said laser oscillator at a value for which said maximum intensity value is detected.

19. A frequency stabilized laser source according to claim 17, in which:
  said laser oscillator comprises an active laser medium; and
  said laser oscillator frequency control means comprises means for transmitting to said active laser medium the intensity, along a predetermined polarization axis, of the probe beam transmitted through the said cell medium.

* * * * *